United States Patent

[11] 3,616,081

[72] Inventor Armindo Cantarutti
 Akron, Ohio
[21] Appl. No. 767,166
[22] Filed Oct. 14, 1968
[45] Patented Oct. 26, 1971
[73] Assignee Intercole Automation, Inc.

[54] METHOD OF AND APPARATUS FOR HANDLING AND SPLICING STRIPS OF RUBBER, PLASTIC AND THE LIKE
6 Claims, 3 Drawing Figs.

[52] U.S. Cl. .................................................. 156/502
[51] Int. Cl. .................................................. B65h 21/00
[50] Field of Search .................................... 156/502; -
                                                  242/58.1-58.8

[56] References Cited
UNITED STATES PATENTS
2,940,506  6/1960  McKee et al. ................. 156/502
3,384,527  5/1968  Fener .......................... 156/502

Primary Examiner—Robert F. Stahl
Attorney—Watts, Hoffman, Fisher & Heinke

ABSTRACT: Apparatus and method for joining ends of strips of rubber or plastic material or the like, such as, strips from a rubber mill, to facilitate further processing. A generally horizontally disposed trailing end of a strip is directed downward to depend from a path of strip movement in advance of a splicing mechanism, a leading end of a succeeding strip is advanced relative to the preceding strip, and subsequent concurrent and equal advance of both strips automatically overlaps the ends for splicing.

INVENTOR.
ARMINDO CANTARUTTI
BY Watts, Hoffmann, Fisher & Heinke
ATTORNEYS.

3,616,081

METHOD OF AND APPARATUS FOR HANDLING AND SPLICING STRIPS OF RUBBER, PLASTIC AND THE LIKE

This invention relates to the handling and splicing of strips of rubber, plastic and the like.

Rubber and plastic stock to be processed into sheets may typically be worked as a batch in a roll mill, and then be removed as a strip of uncured material. This strip may be subsequently festooned on a rack or "batch-off" apparatus for cooling, curing, and/or other processing. For convenience in transferring strips to a batch-off apparatus, and the like, it is often desirable to splice successive strips of material together. One effective manner of splicing strips is to overlap the adjacent end portions of two strips and mechanically knead the ends together, as by rolling with gear teeth or cog wheels, and the like. However, the strips of material are quite bulky and often difficult to manually overlap, especially for a single operator.

It is an object of this invention to provide new and improved methods of and apparatus for overlapping adjacent ends of successive strips of rubber or plastic material, and the like, prior to splicing the strips together, etcetera.

It is another object of this invention to provide new and improved methods of and apparatus for overlapping adjacent ends of successive strips of rubber or plastic material, and the like, prior to splicing, without necessitating manual lifting or handling of the strips to effect the overlap once the strips have been directed along a path of travel to a splicer.

It is another object of this invention to provide new and improved methods of and apparatus for overlapping and splicing adjacent ends of successive strips of rubber or plastic material or the like that are moved along a path having a horizontal component of direction, in which a trailing end portion of a preceding strip is moved from said path to depend therefrom, and a leading end portion of a succeeding strip is advanced along said path relative to said preceding strip to a location where subsequent equal advancement of both strips along said path will result in an overlapping of said leading and trailing end portions.

It is another object of this invention to provide new and improved methods of and apparatus for overlapping and splicing adjacent ends of successive strips of rubber or plastic material and the like, in which successive strips are advanced across a gap in a conveying path that extends through a splicing means downstream of said gap, a trailing end portion of a preceding strip is moved downward through said gap to depend from said path, and a leading end portion of a succeeding strip is advanced toward said gap relative to said preceding strip to position said leading end portion a distance from the gap less than the length of said depending trailing end portion, whereby subsequent equal advancement of both strips along said path will overlap said leading and trailing ends prior to their movement through said splicing means.

It is another and more specific object of this invention to provide new and improved apparatus of the type referred to for handling strips of rubber or plastic and the like and which includes conveying means for supporting and moving strip material along a path to a splicing mechanism, which conveying means includes a power driven portion and an idler portion downstream thereof and separated therefrom by a transverse gap across the path, roll means extending substantially the width of the conveyor means reciprocable through said gap between upper and lower positions above and below the conveying means for engaging a trailing portion of a strip of material and moving the trailing portion downward so that the trailing portion depends from the conveying path, and means operable to move said roll means between said upper and lower positions.

These and other objects, features and advantages of this invention will become more apparent from the following detailed description, when considered in connection with the accompanying drawings forming a part of this specification, and in which.

Figure 1:
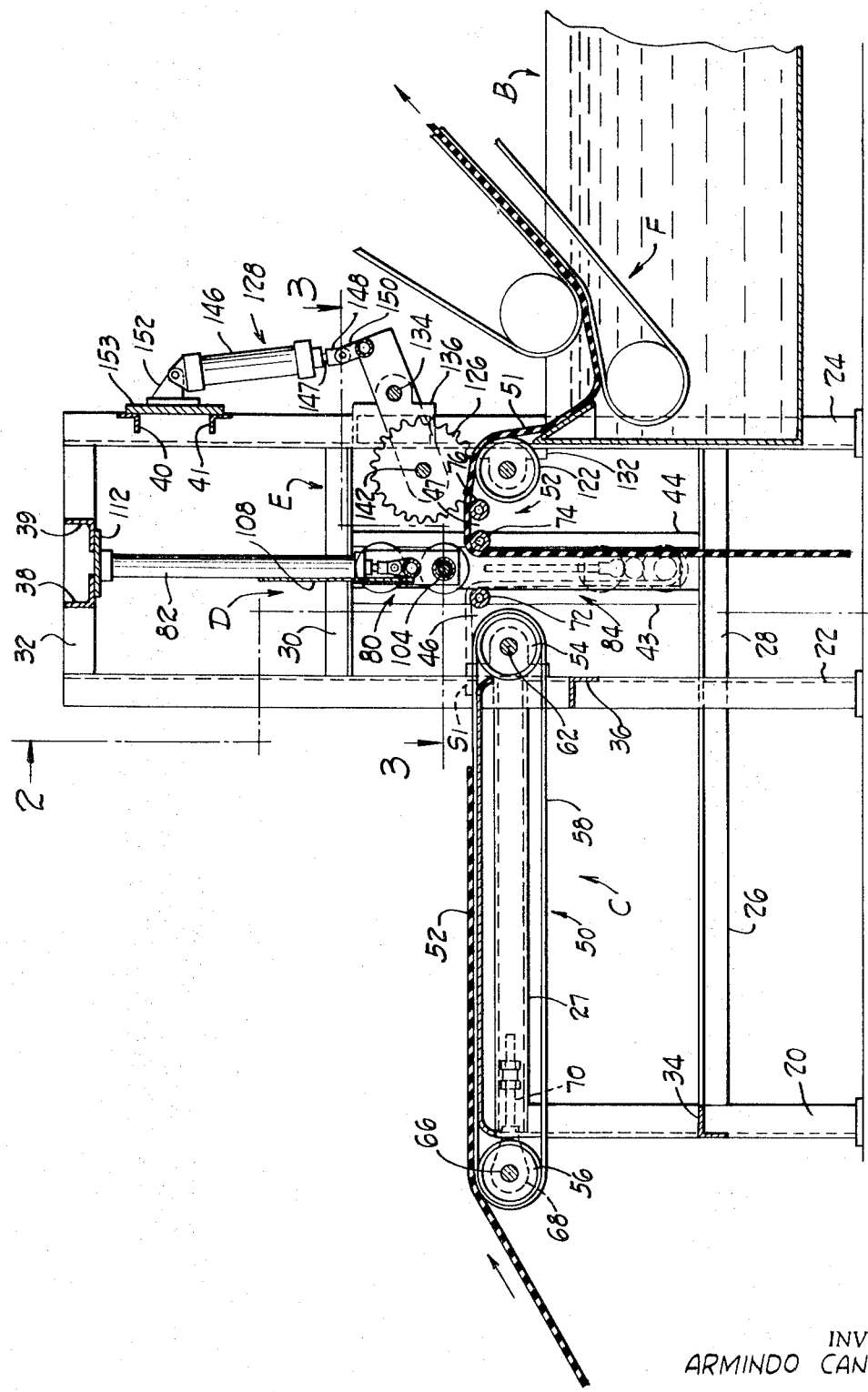
FIG. 1 is a longitudinal sectional view of apparatus embodying the present invention for handling and splicing strips of rubber, plastic and the like, taken along the line 1—1 of FIG. 2.

With reference now to the drawings, a strip handling and splicing apparatus A embodying the present invention is shown in FIG. 1 along with a strip treating tank B downstream from the handling and splicing apparatus in the direction of work movement. The handling and splicing apparatus A includes a conveyor means C, a vertically movable roll assembly D and a splicer mechanism E. The conveyor C serves to carry successive strips of material, such as uncured rubber, plastic or the like, two of which are shown at S1 and S2, along a path through the splicer E. The reciprocable roll assembly D serves to position a trailing portion of a strip S1 in a depending position, so that the strips S1, S2 can be automatically overlapped and then fed through the splicer E. The splicer E mechanically splices the two overlapped ends of the strips together, as by kneading or "stitching" the overlapped portions together. The treating tank B includes a conveying mechanism F that receives the strip that is advanced through the handling and splicing apparatus A and which carries the strip to subsequent apparatus, such as a batch-off machine on which the strip is festooned for drying, cooling, curing or the like.

The conveyor C, roll assembly D, and splicer E are supported by a framework G adjacent the tank B at the downstream side and adjacent a source (not spaced strip material, such as an open rubber mill or the like, on the upstream or left hand side of the apparatus, as viewed in FIG. 1. The framework G includes pairs of longitudinally spaced uprights 20, 22, 24, one of each pair being on an opposite side of the apparatus; pairs of longitudinally extending connecting beams 26, 27, 28, 30, 32; and transverse connecting beams 34 and 36 between uprights 20 and 22, beams 38 and 39 between the pair of spaced longitudinal beams 32, and beams 40 and 41 between the pair of uprights 24. In addition, an auxiliary frame on each opposite side of the main frame, is provided by vertical angle iron members 43, 44 between the longitudinal beams 28 and 30, and by short longitudinal angle iron members 46, 47 between the vertical members 43, 44 and the respective adjacent upright 22, 24.

The conveyor means C is supported generally horizontally by the framework G, and defines a path of strip movement through the handling and splicing apparatus A. The conveyor means C includes a driven conveyor portion indicated generally at 50, and an idler conveyor indicated generally at 52. In the preferred embodiment shown, the driven conveyor portion 50 is a belt conveyor, including a drive roll 54 at one end, and idler roll 56 at the other end, a conveyor belt 58 trained about the rolls 54, 56, and a belt support table 60 carried by the framework and extending beneath an upper reach of the belt 58, between the two rolls 54, 56. The roll 54 is carried at a fixed location by a roll shaft 62 supported in bearing blocks 64 at opposite ends of the shaft 62 and secured to the transversely spaced uprights 22. A suitable pulley or chain drive (not shown) is connected to the shaft 62 in a conventional manner to drive the roll 54 in a clockwise direction, as viewed in FIG. 1. The roll 56 is supported by a roll shaft 66 in bearing supports 68 that are carried by longitudinally movable support brackets 70, which permit tension adjustment of the belt 58.

The idler conveyor portion 52 consists of three transversely extending rolls 72, 74, 76 horizontally aligned so that an upper surface of each roll extends in a general continuation of the plane defined by the upper reach of the belt 58, or just slightly above the plane. The roll 72 is supported for rotation at opposite ends in the vertical members 43 of the auxiliary frame, the roll 74 is supported by the vertical members 43 of the auxiliary frame, the roll 74 is supported by the vertical members 44, and the roll 76 is supported by the longitudinal connecting members 47. The rolls 72, 74 are spaced from each other longitudinally in the direction of work travel along the path defined by the conveyor means C to provide a transverse gap through which a trailing end portion of a strip can be moved to depend from the path of strip travel, as depicted in FIG. 1.

The reciprocable roll assembly D includes a roll mounting assembly 80 for carrying a push roller, a supporting and actuating motor 82, for reciprocating the roll mounting assembly, and a roll guide assembly 84 for establishing a path of movement of the roll mounting assembly and for maintaining the push roll, horizontally aligned.

Figure 2:
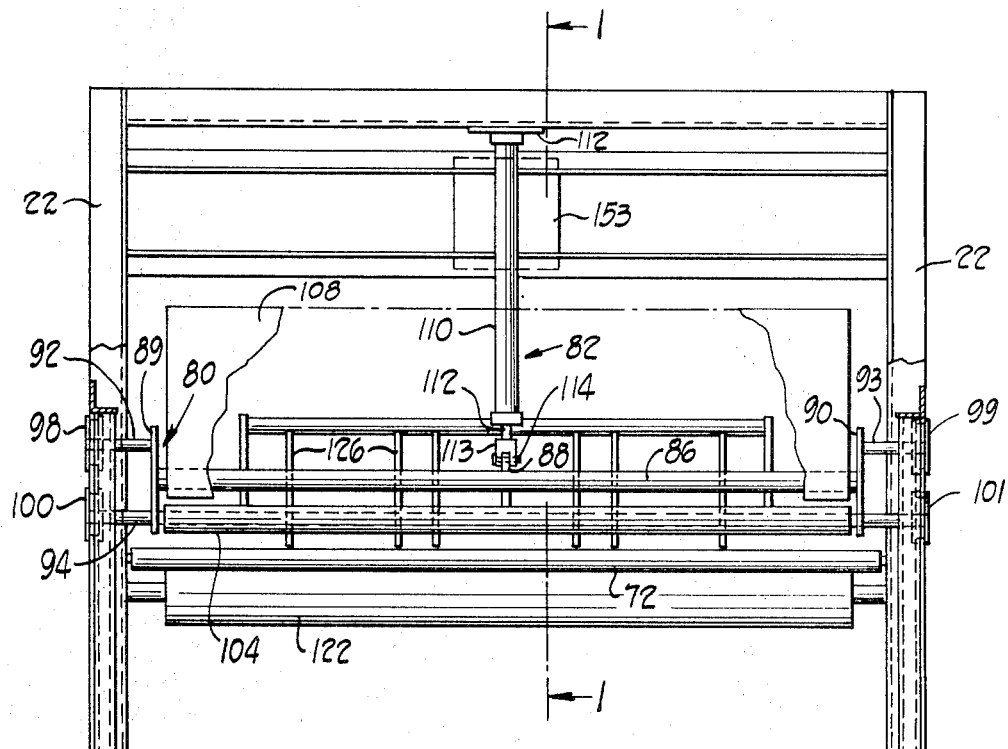
FIG. 2 is an elevational view of the apparatus of FIG. 1, with parts removed, and parts in section, as viewed approximately from the line 2—2 of FIG. 1.
Figure 3:
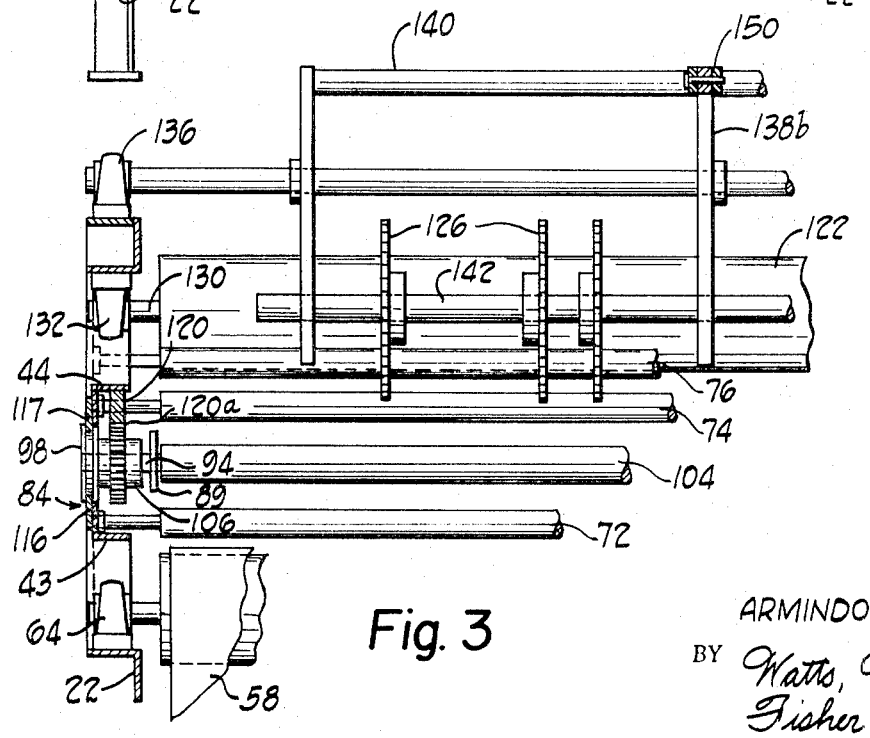
FIG. 3 is a partial sectional view taken along the line 3—3 of FIG. 1.

The roll mounting assembly 80 is best shown in FIG. 2 and includes a main support tube 86 extending transversely of the conveyor C, substantially the width thereof and located directly above the gap between the idler rolls 72, 74, when the roll assembly is in an upper position, as shown. A central lug 88 extends upward from the main support tube 86 for attachment to the supporting and actuating motor 82. Vertical plates 89, 90 are carried at opposite ends of the main support tube 86, extend above and below the tube, and each support a separate upper shaft 92, 93, respectively, and a common lower shaft 94, all of which extend horizontally in a common vertical plane. Grooved guide wheels 98, 99 are carried by shafts 92, 93 and vertically aligned guide wheels 100, 101 are carried at opposite ends of the shaft 94. These wheels are restrained to a vertical path by the roll guide assembly 84. A traveling roller or push roll 104 is carried by and is freely rotatable in the shaft 94, between the supporting plate 89, 90 and gears 106 are keyed to the shaft 94, one adjacent each end, between the vertical members 43, 44 of the auxiliary frame, as best shown in FIG. 3. A vertical divider plate 108 is secured at its lower edge to the main support tube 86 and extends upward approximately a distance equal to the vertical travel of the assembly 80. The divider plate extends substantially the width of the roll 104 and prevents contact between portions of a strip that depend opposite each other as a loop is formed in the strip by downward movement of the roll.

The supporting and actuating motor 82 is comprised of a fluid cylinder 110 that depends vertically from a support plate 112 secured to the transverse beams 38, 39 in a longitudinal midplane of the framework. A piston rod 112 extends from the lower end of the cylinder 110 and carries a clevis 113 that receives the lug 88 and which is secured thereto by a pin 114.

The roll guide assembly 84 restrains the reciprocating movement of the roll-mounting assembly 80 to a vertical path between the spaced conveyor rolls 72, 74 and maintains the roll horizontal during its movement so that the roll acts on a strip of material uniformly across the width thereof. Two spaced vertical guide strips 116, 117 are secured to and extend slightly inward from the vertical angle iron members 43, 44 of the auxiliary frame on each side of the apparatus. The inner vertical edges of the guide strips 116, 117 establish a vertical passageway in which the guide wheels 98, 100 move. The guide strips of the opposite side of the apparatus similarly receive the guide wheels 99, 101. The inner edges of the guide strips are received within the grooved portions of the guide wheels and act as guide tracks. A vertical rack 120 extends along the vertical angle iron member 44 on each side of the apparatus. A toothed surface 120a of each rack 120 faces the vertical passageway in which the guide wheels and shafts move and engages the adjacent gear 106. The rack and a gear at each end of the shaft 94 of roll 104 are maintained in meshing relationship by the guide strips 116, 117 and the grooved guide wheels 98, 99. This construction assures that opposite ends of the shaft 94 and rack 104 are moved vertically at the same speed so that the roll 104 remains horizontal at all times.

The splicer E, as best shown in FIGS. 1 and 3 includes a smooth surfaced, driven, backup roll 122 that supports and moves a strip of material through the splicer, a pivoted frame assembly 124 that carries stitching sprockets 126, and an actuator 128 for pivoting the frame assembly 124 to selectively control splicing.

The driven backup roll 122 extends transversely of the path of strip travel as generally defined by the conveyor C, and in part supports a strip along the path of travel. The roll 122 is supported on a shaft 130 journaled at opposite ends in bearing blocks 132, which are secured to the transversely spaced upright members 24. The upper surface of the roll is just slightly below the plane defined by the upper surfaces of the idler rolls 72, 74, 76. A suitable pulley or chain drive (not shown) is connected to the shaft 130 of the roll 122 in a conventional manner. In the present embodiment the drive for the roll 122 and the drive for the conveyor belt 58 are interconnected for concurrent operation to advance a strip or strips in the same direction and at the same speed. Alternatively, provision can be made for separately driving the conveyor belt and backup roll either at the same speed or at different speeds to facilitate slight variations in the manner in which strips are handled to overlap the ends, as will be explained in more detail subsequently.

The pivoted frame assembly 124 is supported by a transverse shaft 134, located above and somewhat downstream from the backup roll 122. The shaft 134 is supported by bearing blocks 136 at opposite ends, on the spaced uprights 24. Three parallel arms, two of which are shown at 138a, 138b are spaced along the transverse shaft 134 and are fixedly secured thereto. The arms 138 extend in an upstream direction from the supporting shaft 134 to overlie the backup roll 122 and in a downstream direction from the supporting shaft 134, where they are joined by a transverse rod 140. A transverse shaft 142 is rotatably supported by the extending portion of the arms 138 that overlie the backup roll 122. Six sprockets 126 are spaced along the length of the transverse shaft 142 and are keyed to the shaft. When the frame assembly 124 is pivoted about the supporting shaft 134 in a counterclockwise direction in the orientation of FIG. 1, the sprockets 126 are urged toward the backup roll 122. When the frame assembly 124 is pivoted in a clockwise direction in the orientation of FIG. 1, the sprockets 126 are raised from the backup roll 122, to an inoperative position.

The actuator 128, as shown, comprises a generally vertical fluid cylinder 146 with a piston rod 147 and clevis 148 extending downward from the cylinder and attached to a connecting link 150 at the end of the central transverse arm 138b adjacent the rod 140. The cylinder 146 is pivotally connected at its upper end to a support bracket 152 carried on a mounting plate 153 secured to the transverse beams 40, 41.

In operation, a first strip of material S1 is brought to a position with a leading edge on the conveyor belt 58, in the position of the strip S2 shown in FIG. 1. The roll assembly D is in a raised position and the pivoted frame assembly 124 of the splicer E is pivoted to a position in which the sprockets 126 are raised from a backup roll 122. The driven portion of the conveyor C, the backup roll 122, and the conveyor F of the subsequent treating tank B are then driven at equal speed to advance the strip S1 from the left to the right in the orientation of FIG. 1, along the conveyor C, beneath the roll assembly D, through the splicer E, and on to further treatment, such as through the treating tank B, and subsequently to a batch-off apparatus. The strip S1 has a finite length and its advancement is continued through the apparatus until the trailing end of the strip S1 is on the belt 58 of the driven portion 50 of the conveyor C, somewhat behind the position shown in phantom in FIG. 1. This trailing end is to be overlapped with the leading end portion of a subsequent strip S2. This is accomplished by lowering the roll mounting assembly 80 through actuation of the motor 82. Where the drive for the conveyor belt 58 and the backup roll 122 facilitates only concurrent operation of the belt and roll, both are maintained stationary while the assembly 80 is lowered to move the push roll 104 and the strip S1 downward between the idler rolls 72, 74 to form a depending loop as shown in phantom in FIG. 1. The spacing between the idler rolls 72, 74 of the conveyor C is sufficient to receive two thicknesses of the the conveyor C is sufficient to receive two thicknesses of the strip 51 and the push roll 104. Typically, an operator may assist the roll 104. Typically, an operator may assist the forward movement of the trailing end of the strip S1 by slightly lifting the end from the belt 58. Alternatively, where the belt 58 can be driven separately from the backup roll 122, the belt can be advanced to move the trailing end of the strip S1 forward simultaneously with the downward movement of the push roll 104 and mounting assembly 80, while the backup roll 122 remains stationary. The downward movement of the push roll 104 and the forward movement of the end of the strip S1 continues until the end portion of the strip advances beyond the idler roll 72 and falls to a depending state, as illustrated in FIG. 1. The push roll 104 is then retracted to a position above the conveying path defined by the conveyor C. Downward movement of opposite ends of the roll 104 is controlled by the gears 106 fixed to the ends of the roll shaft 94. As the mounting assembly 80 is moved vertically, the gears are rotated by the fixed racks 120, requiring that both ends move at the same speed, maintaining the roll horizontal and assuring that the strip is advanced uniformly across its width.

The leading end of the succeeding strip S2 is subsequently placed on the belt 58 at a position where the leading end of the strip S2 is spaced a distance from the idler roll 72 less than the depending length of the trailing end portion of the strip S1. This assures that with subsequent equal advance of both the strip S1 and the strip S2, the leading end of the strip S2 will reach the splicing mechanism E before the trailing end of the strip S1, resulting in an overlap. At this time, then, the backup roll 122 of the splicing mechanism and the conveyor F are started to advance the strip S1 at the same speed as the strip S2. As the leading edge of the strip S2 moves across the gap between the idler rolls 72, 74, it contacts the trailing end portion of the strip S1. From this point on, the leading end of the strip S1 overlies the trailing end portion of the strip S2, and the trailing and leading ends of the strips S1, S2 move together across the backup roll 122. The actuator 128 is energized to withdraw the piston rod 147 and pivot the frame assembly 124 counterclockwise about the supporting shaft 134 in the orientation of FIG. 1, to forceably engage the sprockets 125 against the overlapped portions of the strips S1, S2. Typically, the delay prior to the time the overlapped ends reach the backup roll 122 is short enough that the motor 128 can be energized at the same time the conveyor drive is started, simplifying the controls. Alternatively, a delayed actuation or a slow-acting motor can be incorporated so that the sprockets engage the strips only on overlapped portions. The sprocket teeth are of a depth approximating the depth of the overlapped portions and are pressed downward against the material with sufficient force to cause the teeth to penetrate well into the strips, stretching and forcing portions together in a kneading action that produces a strong union, thereby "stitching" the overlapping ends. When the trailing end portion of the leading strip S1 passes beyond the backup roll 122, the frame assembly 124 is pivoted to raise the sprockets 126 out of contact of the strip S2 and the strip S2 is conveyed through the apparatus A until the trailing end lies on the belt 58, at which point the cycle described above is repeated with a subsequent strip.

In apparatus where the belt 58 can be driven separately from the backup roll 122, the leading end of the strip can be placed on the conveyor portion 50 at any location near the downstream end and advanced by the belt 58 to a position where the leading end is properly spaced from the idler roll 72, as already explained. Both the conveyor and the backup roll are then driven forward at the same speed to overlap the ends of the strips. In the event this apparatus is used to splice strips of material that can be advanced to the conveyor mechanism C in relatively rapid succession so that there is no need to delay the movement of the leading strip, the cycle time for overlapping adjacent ends of succeeding strips can be diminished by continuously moving the leading strip through the spicer on the downstream side of the gap and advancing the trailing end thereof and the leading end of a succeeding strip temporarily at a faster speed on the separately driven conveyor portion 50, toward the gap. This faster speed is continued until the trailing end of the leading strip depends through the gap in the conveyor and the leading end of the succeeding strip is advanced to a position closer to the splicing mechanism than is the said trailing end. The speed of the conveyor portion 50 is then reduced to that of the leading strip and ends are overlapped in the manner already described.

In the embodiment shown, the gap between the idler rolls 72, 74, between which the push roll 104 moves, is small enough that the leading end of a strip will readily bridge the gap during movement along the path of travel with typical strip materials. In the event a particular material is too flexible to extend across the gap and the leading end would tend to drop between the two rolls 72, 74, a swing roll or other temporary support can be provided to bridge the gap between the rolls when the leading end of a strip reaches the gap. The swing roll would be pivotally supported for movement between an upper portion in the gap between idler rolls 72, 74 and a lower position beneath and to one side of the gap. Suitable actuating means, such as a fluid cylinder, would selectively position the swing roll in either the upper or lower position. In the lower position, the swing roll would permit the push roll to be lowered and in the upper position it would prevent a leading end of a strip from falling into the gap between the rolls 72 and 74. The gaps between the other idler rolls or the idler rolls and the belt or backup roll can of course be diminished to the extent necessary to provide a continuous path through which the leading ends of the strip to be conveyed will not fall.

It will be apparent from the above description that the aforementioned objects of this invention have been achieved with apparatus that is reliable in operation and economical to fabricate and that the improved methods and apparatus facilitate the overlapping and splicing of adjacent ends of succeeding strips of material with a minimum of manual manipulation of the material.

Although a preferred embodiment of the present invention has been described with particularity, it will be understood that numerous modifications or alterations may be made therein without departing from he spirit and scope of the invention as set forth in the appended claims.

What is claimed is:

1. Apparatus for handling strips of rubber or plastic material and the like comprising means to support and convey material in strip form and at least in part defining a path of travel for said material, said means at least in part defining a gap across said path and at least in part including power-driven strip-supporting means upstream of and adjacent to said gap; means to selectively engage an upper surface of a strip on said support means directly above said gap and movable through said path and gap between an upper position above said supporting and conveying means and lower position beneath said supporting and conveying means, and means to move said strip-engaging means between said upper and lower positions.

2. Apparatus for overlapping and splicing strips of rubber or plastic material and the like comprising a splicing mechanism, means to support and convey material in strip form along a path to the slicing mechanism, said means providing a gap extending transversely of said path, and roll means movable downward adjacent said gap to engage and move a portion of a strip of material being supported on said supporting and conveying means downward through said gap to depend from said path.

3. Apparatus for overlapping and splicing strips of rubber or plastic material and the like comprising a splicing mechanism, means to support and convey material in strip form along a path to the splicing mechanism, said means providing a gap extending transversely of said path, roll means movable downward adjacent said gap to engage and move a portion of a strip of material being supported on said supporting and conveying means downward through said gap to depend from said path and means to maintain said roll means horizontal during movement thereof from an upper to a lower position.

4. Apparatus for handling and splicing strips of rubber or plastic and the like comprising a splicing mechanism selectively operable to join overlapped ends of strips of rubber or plastic material and the like, conveying means for supporting strip material for movement along a path to said splicing mechanism, including a power driven conveyor portion, a transversely extending gap between said power driven conveyor portion and said splicing mechanism, roll means extending substantially the width of said conveying means and supported for movement through said gap between upper and lower positions above and below said conveying means, the size of said gap being sufficient to receive both said roll means and a portion of a strip of material that extends across the gap and that is engaged by said roll means, and power means operable to move said roll means between said upper and lower positions.

5. Apparatus for handling and splicing strips of rubber or plastic and the like comprising a splicing mechanism selectively operable to join overlapped ends of strips of rubber or plastic material and the like, conveying means for supporting strip material for movement along a path to said splicing mechanism, including a power driven conveyor portion and an idler portion downstream thereof in the direction of strip movement along said path and upstream of said splicing mechanism, a transverse gap between said power driven conveyor portion and said splicing mechanism, roll means extending substantially the width of said conveying means and supported for movement through said gap between upper and lower positions above and below said conveying means, the size of said gap being sufficient to receive both said roll means and a portion of a strip of material that extends across the gap and that is engaged by said roll means, power means operable to move said roll means between said upper and lower positions, said roll means including a horizontal rotatable support shaft, a roll rotatable on said shaft, and means at opposite ends of said support shaft positively restraining each opposite end against vertical movement at a speed different from the other, to maintain said shaft and roll horizontal.

6. Apparatus for handling said splicing strips of rubber or plastic and the like comprising a splicing mechanism selectively operable to join overlapped ends of strips of rubber or plastic material and the like, conveying means for supporting strip material for movement along a path to said splicing mechanism including a power driven conveyor portion upstream of said splicing mechanism in the direction of strip movement along said path, means establishing a transverse gap in said path upstream of said splicing mechanism through which a trailing end portion of a strip can depend from said path, and controlled means to selectively cause a portion of a strip supported on said conveying means to depend from said path through said gap.

* * * * *